(12) United States Patent
Ricart et al.

(10) Patent No.: US 10,882,420 B2
(45) Date of Patent: Jan. 5, 2021

(54) TRACK ASSEMBLY

(71) Applicant: Lear Corporation, Southfield, MI (US)

(72) Inventors: Raúl Ricart, Valls (ES); Jose Gabriel Fernández Bañares, Valls (ES); Jeffrey A. Jones, Ann Arbor, MI (US); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/296,379

(22) Filed: Mar. 8, 2019

(65) Prior Publication Data

US 2020/0282871 A1 Sep. 10, 2020

(51) Int. Cl.
| | |
|---|---|
| *F16M 13/00* | (2006.01) |
| *B60N 2/07* | (2006.01) |
| *B60N 2/90* | (2018.01) |
| *G01D 5/14* | (2006.01) |

(52) U.S. Cl.
CPC ......... *B60N 2/0735* (2013.01); *B60N 2/0707* (2013.01); *B60N 2/0715* (2013.01); *B60N 2/90* (2018.02); *G01D 5/14* (2013.01)

(58) Field of Classification Search
CPC ....... B60N 2/06; B60N 2/002; G01D 5/34746
See application file for complete search history.

(56) References Cited

U.S. PATENT DOCUMENTS

| | | |
|---|---|---|
| 2,126,143 A | 8/1938 | McGregor |
| 2,263,554 A | 11/1941 | Brach |
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,940,182 A | 2/1976 | Tamura |
| 4,020,769 A | 5/1977 | Keir |

(Continued)

FOREIGN PATENT DOCUMENTS

| | | |
|---|---|---|
| CN | 203190203 U | 9/2013 |
| CN | 203799201 U | 8/2014 |

(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Amy J. Sterling
(74) *Attorney, Agent, or Firm* — Fishman Stewart PLLC

(57) ABSTRACT

A track assembly includes a support assembly, an electronic control unit and a track. The track may include a first track. The first track may include one or more segments. The one or more segments may include a plurality of first features. The support assembly may include a first sensor and/or a second sensor that may be connected to the electronic control unit. The electronic control unit may be configured to determine a first location of the support assembly along the one or more segments via the plurality of first features, the first sensor, and/or the second sensor. The first sensor and/or the second sensor may be disposed substantially in the track. The first sensor and/or the second sensor may be configured to sense information from the plurality of first features. The first features may include a first portion and/or a second portion.

20 Claims, 9 Drawing Sheets

(56) References Cited

U.S. PATENT DOCUMENTS

| | | |
|---|---|---|
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 * | 12/2009 | Steenwyk ............. B60N 2/002 |
| | | 324/457 |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 3,800,949 A1 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |

(56) References Cited

U.S. PATENT DOCUMENTS

| | | |
|---|---|---|
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1* | 3/2017 | Bonk ................ G01D 5/34746 |
| 2017/0080826 A1* | 3/2017 | Bonk ...................... B60N 2/06 |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0269754 A1 | 8/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 1222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

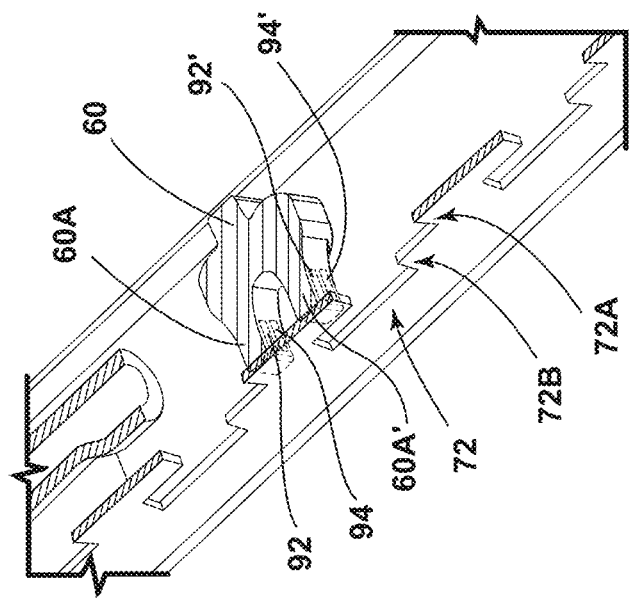
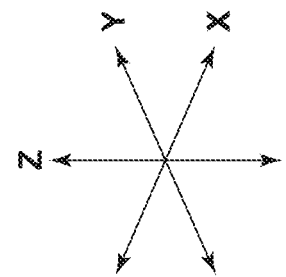
FIG. 5D
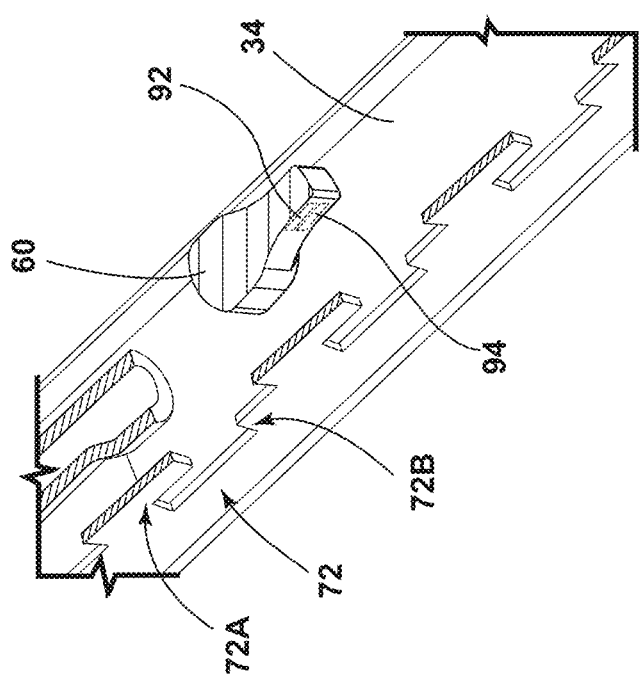
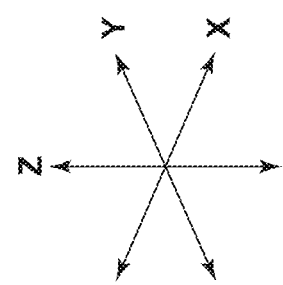
FIG. 5C

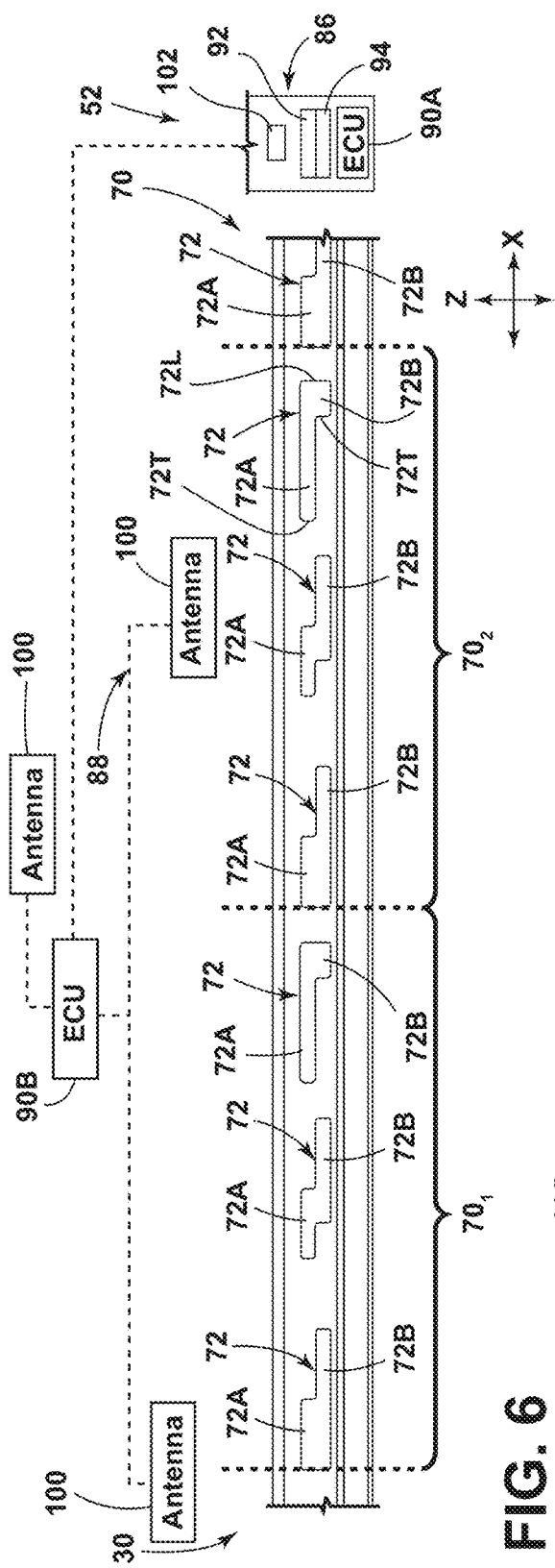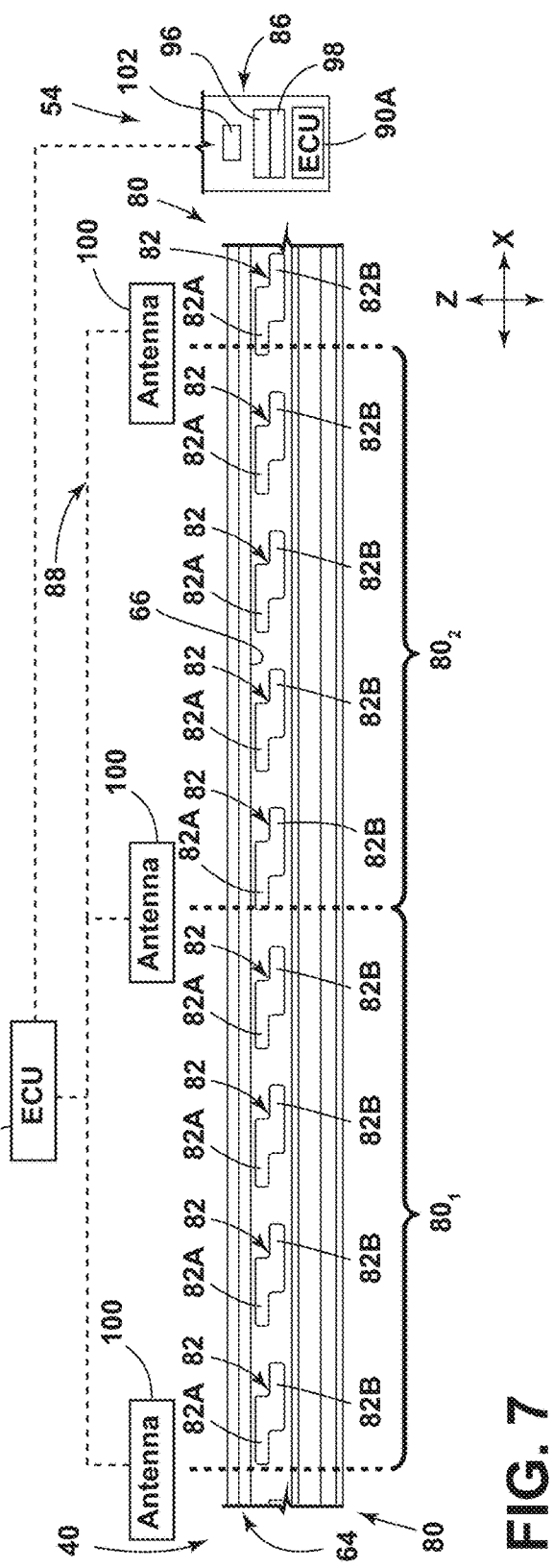

TRACK ASSEMBLY

TECHNICAL FIELD

The present disclosure generally relates to track assemblies, including track assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assembles may be relatively complex and/or may not provide sufficient functionality. Some track assemblies may not be configured to determine an absolute position of a support assembly along a track.

There is a desire for solutions/options that minimize or eliminate one or more challenges or shortcomings of track assemblies. The foregoing discussion is intended only to illustrate examples of the present field and should not be taken as a disavowal of scope.

SUMMARY

In embodiments, a track assembly may include a support assembly, an electronic control unit and a track. The track may include a first track. The first track may include one or more segments. The one or more segments may include a plurality of first features. The support assembly may include a first sensor and/or a second sensor that may be connected to the electronic control unit. The electronic control unit may be configured to determine a first location of the support assembly along the one or more segments via the plurality of first features, the first sensor, and/or the second sensor. The first sensor and/or the second sensor may be disposed substantially in the track. The first sensor and/or the second sensor may be configured to sense information from the plurality of first features. The first features may include a first portion and/or a second portion. The first sensor may be configured to read information from the first portion and/or the second sensor may be configured to read information from the second portion.

With embodiments, the electronic control unit may be configured to read information from the first sensor and/or the second sensor. The electronic control unit may include a profile of location information. The electronic control unit may be configured to compare the information from the first sensor and/or the second sensor with the profile to determine an absolute location of the support assembly. Each segment of the one or more segments may include a common configuration of the plurality of first features, and/or each first feature of the common configuration may include a different shape. The track may include a second track having a plurality of second features, a third sensor, and/or a fourth sensor. The electronic control unit may be configured to receive information from the third sensor and/or the fourth sensor to determine an absolute location of the support assembly along the second track. the electronic control unit may be configured to determine the absolute location of the support assembly via information from the first sensor and/or the second sensor, and information from the third sensor and/or the fourth sensor.

In embodiments, the second track may include one or more segments and/or the one or more segments of the second track may include the plurality of second features. At least one of the plurality of second features may have a different shape than at least one of the first features. The segments of the first track may be offset in an X-direction from the segments of the second track.

With embodiments, a track assembly may include a support assembly, an electronic control unit, a track, a first location system, and/or a second location system. The track may have a plurality of segments. The first location system may include a first sensor and/or a second sensor. The second location system may include a transmitter and/or a receiver (e.g., an antenna). The plurality of segments may include a plurality of first features, and/or the electronic control unit may be connected (e.g., directly or indirectly, wirelessly and/or via a wired connection) to the first location system and/or the second location system. The electronic control unit may be configured to determine, via the first location system, a first location of the support assembly.

In embodiments, the electronic control unit may be configured to determine, via the second location system, a second location of the support assembly. The second location may include a segment of the plurality of segments in which the support assembly may be at least partially disposed. The first location may be a location of the support assembly within the segment. The electronic control unit may be configured to determine an absolute position of the support assembly along the track via the first location and/or the second location. The track may be at least 100 cm long, and/or a combined resolution of the first location system and/or the second location system may be less than about 15 mm.

With embodiments, the track assembly may include one or more additional receivers, and/or the transmitter may be connected to move with the support assembly. The receiver and/or the one or more additional receivers may be disposed proximate respective segments of the plurality of segments. The electronic control unit may be configured to receive information from the receiver and/or the one or more additional receivers indicating a location of the transmitter.

In embodiments, a method of operating a track assembly may include providing a track having a first track and one or more segments. The one or more segments may include a plurality of first features. The method may include providing a support assembly that may include a first sensor and/or a second sensor configured to sense the plurality of first features. The method may include providing an electronic control unit that may be connected e.g., directly or indirectly, wirelessly and/or via a wired connection) to the first sensor and/or the second sensor. The method may include connecting the support assembly with the track. The method may include determining a first location of the support assembly in a segment of the one or more segments via the first sensor, the second sensor, and/or the electronic control unit.

With embodiments, the method may include providing a transmitter and/or one or more receivers. The method may include determining a second location of the support assembly along the track via the transmitter and/or the one or more receivers. The method may include determining an absolute position of the support assembly along the track via the electronic control unit from the first location and/or the second location. The method may include moving the support assembly until at least one of the first sensor and/or the second sensor may sense a leading edge and/or a falling edge of at least one of the plurality of first features. The resolution of the absolute position may be about 2 mm or less.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 5C and 5D are cross-sectional perspective views generally illustrating portions of an embodiment of a track assembly according to teachings of the present disclosure.

FIG. 6 is a cross-sectional view generally illustrating portions of a first track according to teachings of the present disclosure.

FIG. 7 is a cross-sectional view generally illustrating portions of a second track according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
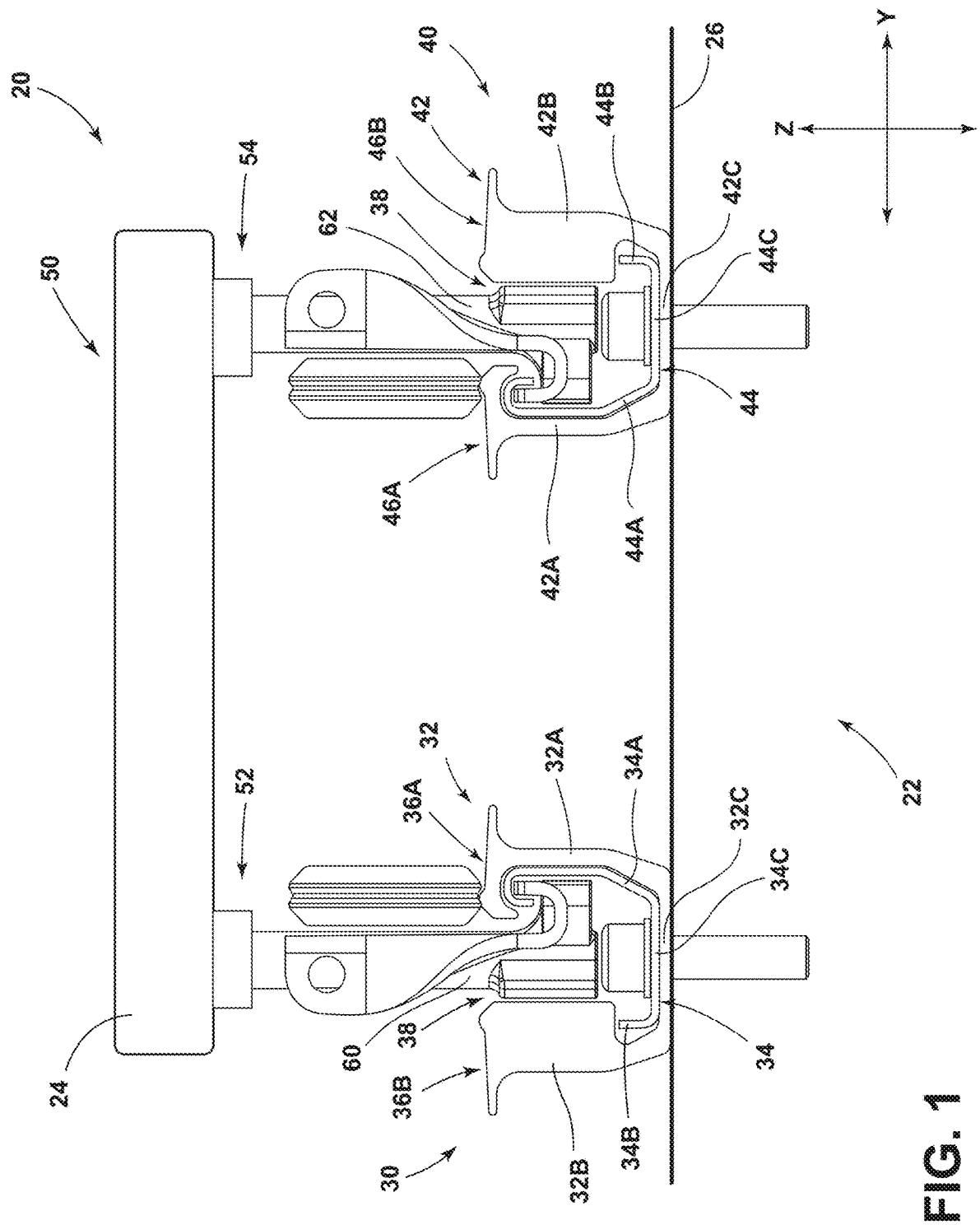
FIG. 1 is a cross-sectional view generally illustrating an embodiment of a track assembly according to teachings of the present disclosure.
Figure 2:
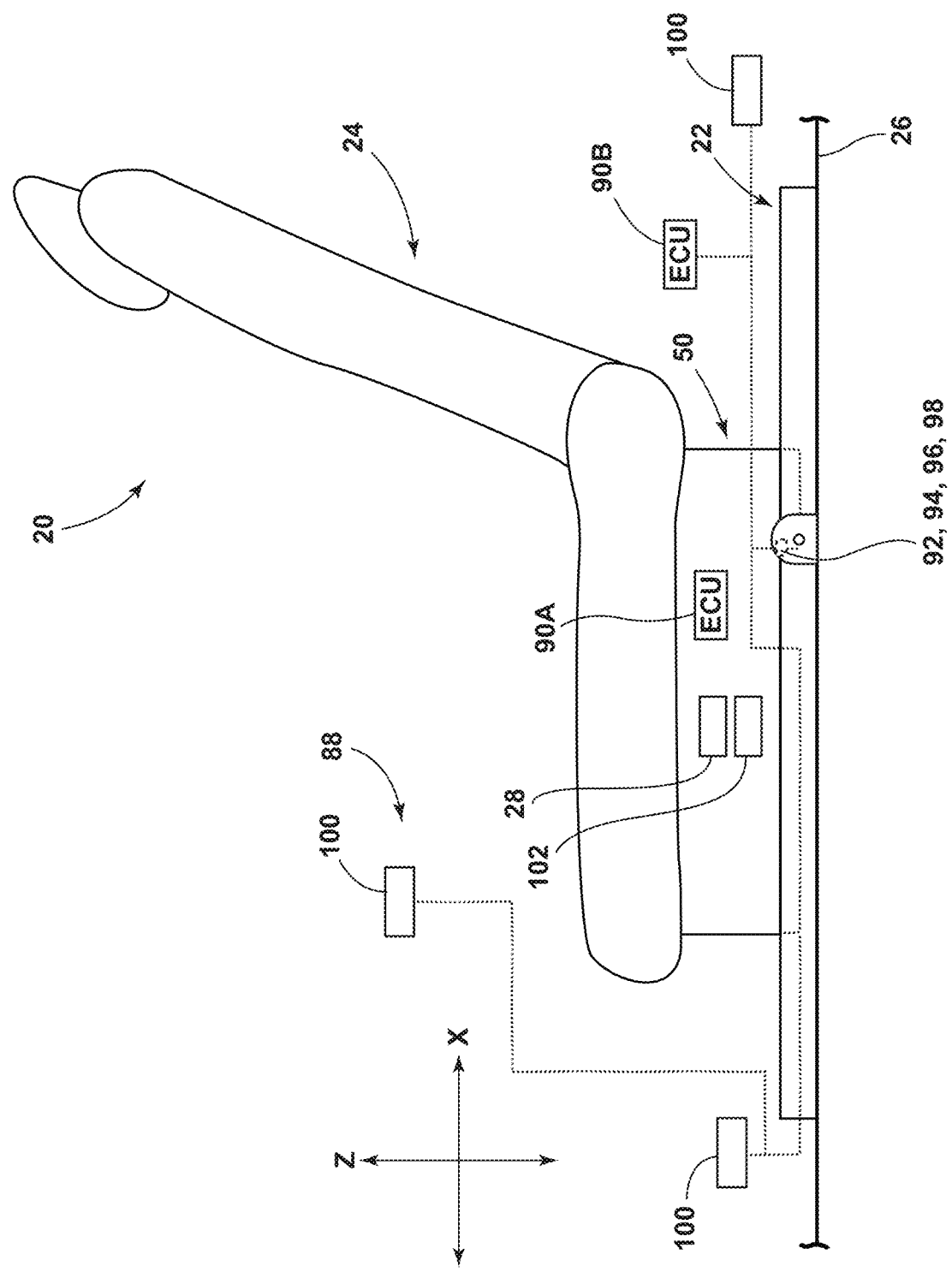
FIG. 2 is a side view generally illustrating an embodiment of a track assembly according to teachings of the present disclosure.
Figure 4:
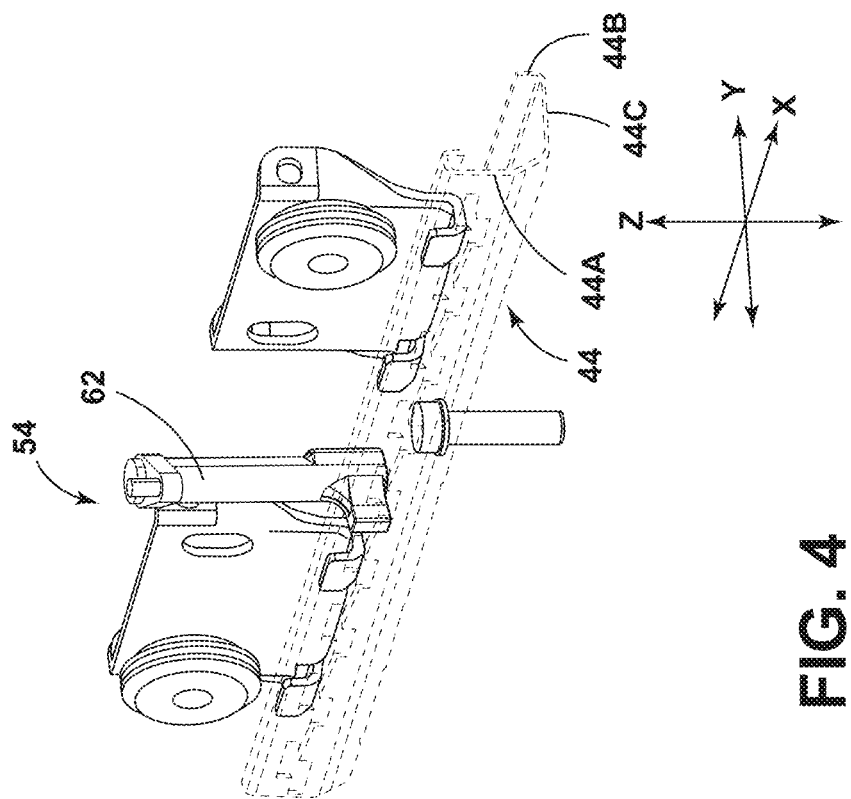
FIG. 4 is a perspective view generally illustrating portions of an embodiment of a track assembly, with some portions shown as semitransparent, according to teachings of the present disclosure.
Figure 3:
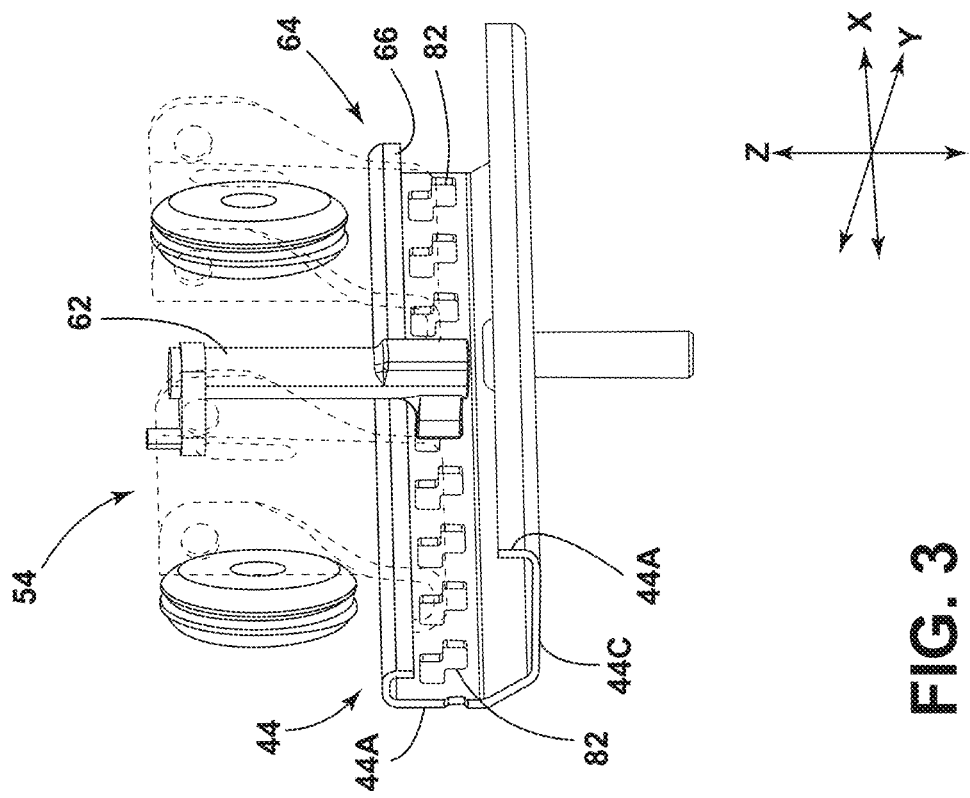
FIG. 3 is a perspective view generally illustrating portions of an embodiment of a track assembly, with some portions shown as semitransparent, according to teachings of the present disclosure.

In embodiments, such as generally illustrated in FIG. 1, a track assembly 20 may include a track 22 and/or a support assembly 50. The track 22 may include a first track 30 and/or a second track 40. The support assembly 50 may support and/or be connected to one or more of a variety of components. For example and without limitation, a support assembly 50 may be connected to a vehicle seat 24 (see, e.g., FIGS. 1 and 2). The first track 30 and/or the second track 40 may, for example, be connected to a mounting surface 26, such as a vehicle floor.

With embodiments, a first support member 52 and/or a second support member 54 may be selectively connected to a (e.g., engaged with) a first track 30 and/or a second track 40. The first support member 52 and/or the second support member 54 may extend substantially longitudinally (e.g., in the X-direction). The first track 30 and/or the second track 40 may extend substantially longitudinally (e.g., in the X-direction). For example and without limitation, the first support member 52 and/or the second support member 54 may move (e.g., slide, roll, translate, etc.) in a longitudinal direction along the track 22. The first support member 52 and/or the second support member 54 may selectively engage and/or disengage from the track 22. The first support member 52 and/or the second support member 54 may include a cassette configuration.

In embodiments, such as generally illustrated in FIG. 1, a first track 30 may include an outer track 32 and/or an inner track 34. The second track 40 may include an outer track 42 and/or an inner track 44. The outer tracks 32, 42 and/or the inner tracks 34, 44 may extend in a longitudinal direction (e.g., the X-direction). The outer tracks 32, 42 may include a first wall 32A, 42A (e.g., a side wall), a second wall 32B, 42B (a side wall), and/or a third wall 32C, 42C (e.g., a bottom wall). The first wall 32A, 42A, the second wall 32B, 42B, and/or the third wall 32C, 42C may be connected to form a generally U-shaped configuration. The bottom wall 32C, 42C may, for example, be substantially planar/horizontal. The first wall 32A, 42A and/or the second wall 32B, 42B may extend substantially perpendicularly (e.g., vertically) from the third wall 32C, 42C. The first wall 32A, 42A may include a first portion 36A, 46A, and/or the second wall 32B, 42B may include a second portion 36B, 46B. The first portion 36A, 46A and/or the second portion 36B, 46B may project laterally inward toward a center of the track 22 (e.g., in a Y-direction). The first portion 36A, 46A and/or the second portion 36B, 46B may be substantially planar. In embodiments, the first portion 36A, 46A and/or the second portion 36B, 46B may be disposed such that a gap 38 is provided between the first portion 36A, 46A and the second portion 36B, 46B (e.g., the first portion 36A, 46A and the second portion 36B, 46B may be offset in the Y-direction). The gap 38 may extend longitudinally along the track 22, and/or the gap 38 may be centered along the track 22. The first track 30 and the second track 40 may for example and without limitation, be substantially identical and/or may be connected to a mounting surface 26 in a mirrored configuration.

With embodiments, the inner tracks 34, 44 may be disposed at least partially within the outer tracks 32, 42. The inner tracks 34, 44 may be substantially U-shaped. The inner tracks 34, 44 may include a first wall 34A, 44A, a second wall 34B, 44B, and/or a third wall 34C, 44C. The second wall 34B, 44B may be shorter (e.g., in a Z-direction) than the first wall 34A, 44A. The second wall 34B, 44B may be at least partially bent and/or curved. The first wall 34A, 44A and/or the second wall 34B, 44B may extend substantially perpendicular (e.g., in the Z-direction) from the opposite sides of the third wall 34C, 44C.

In embodiments, such as generally shown in FIGS. 3, 4, 5A, and 5B, the first support member 52 and/or second support member 54 may include an armature 60, 62. The armatures 60, 62 may be configured to move with the support assembly 50 and/or may be configured to move (e.g., rotate) relative to the support assembly 50. For example and without limitation, an actuator 64, 66 may be configured to rotate the armature 60, 62, such as about an axis substantially parallel to the Z-direction (see, e.g., FIGS. 5A and 5B). The armatures 60, 62 may extend from the support member 52, 54 and/or may be disposed at least partially in the track 22. The armatures 60, 62 may include protrusions 60A, 62A that may extend substantially perpendicular from the armatures 60, 62 (see, e.g., FIG. 9).

Figure 5B:
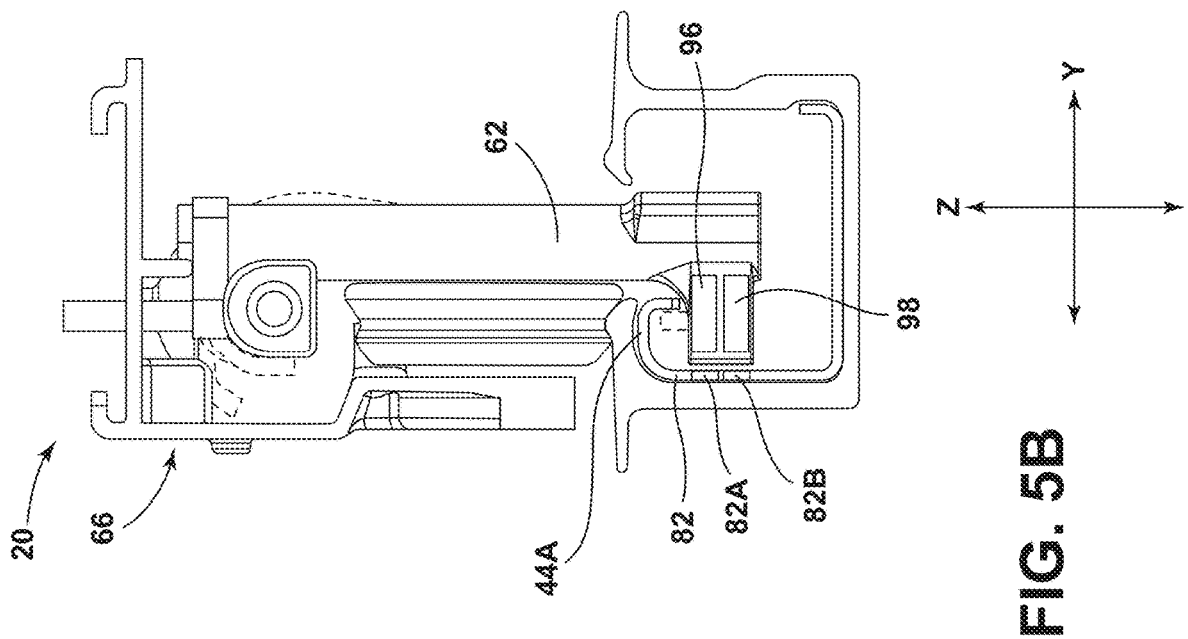
FIGS. 5A and 5B are cross-sectional views generally illustrating portions of an embodiment of a track assembly according to teachings of the present disclosure.
Figure 5A:
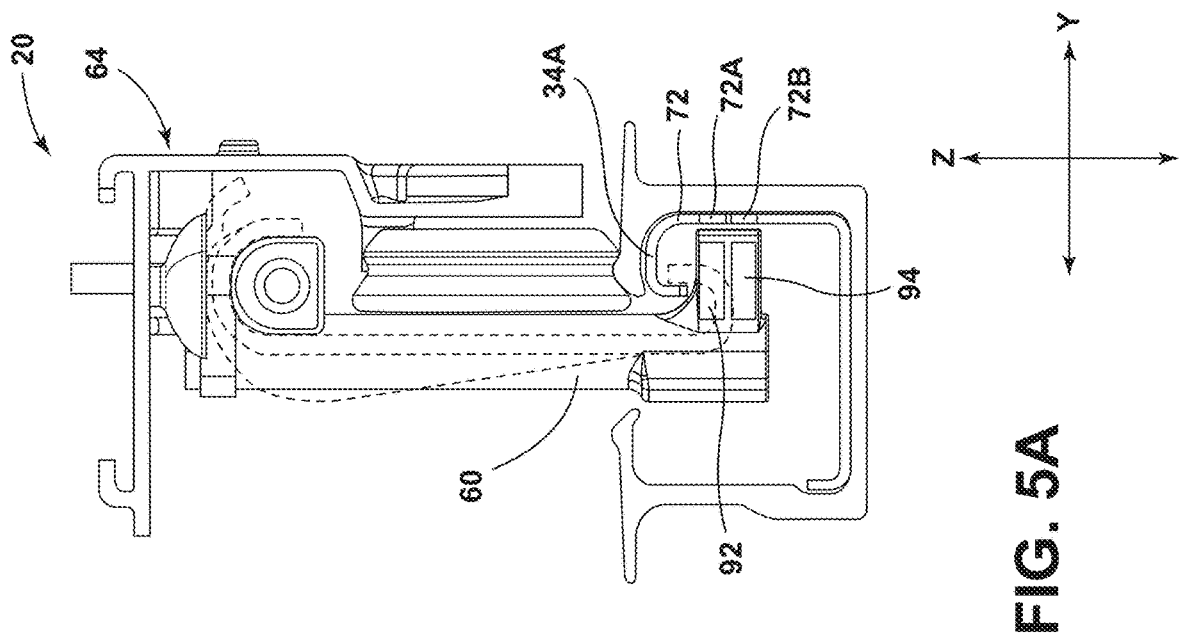
Figure 9:
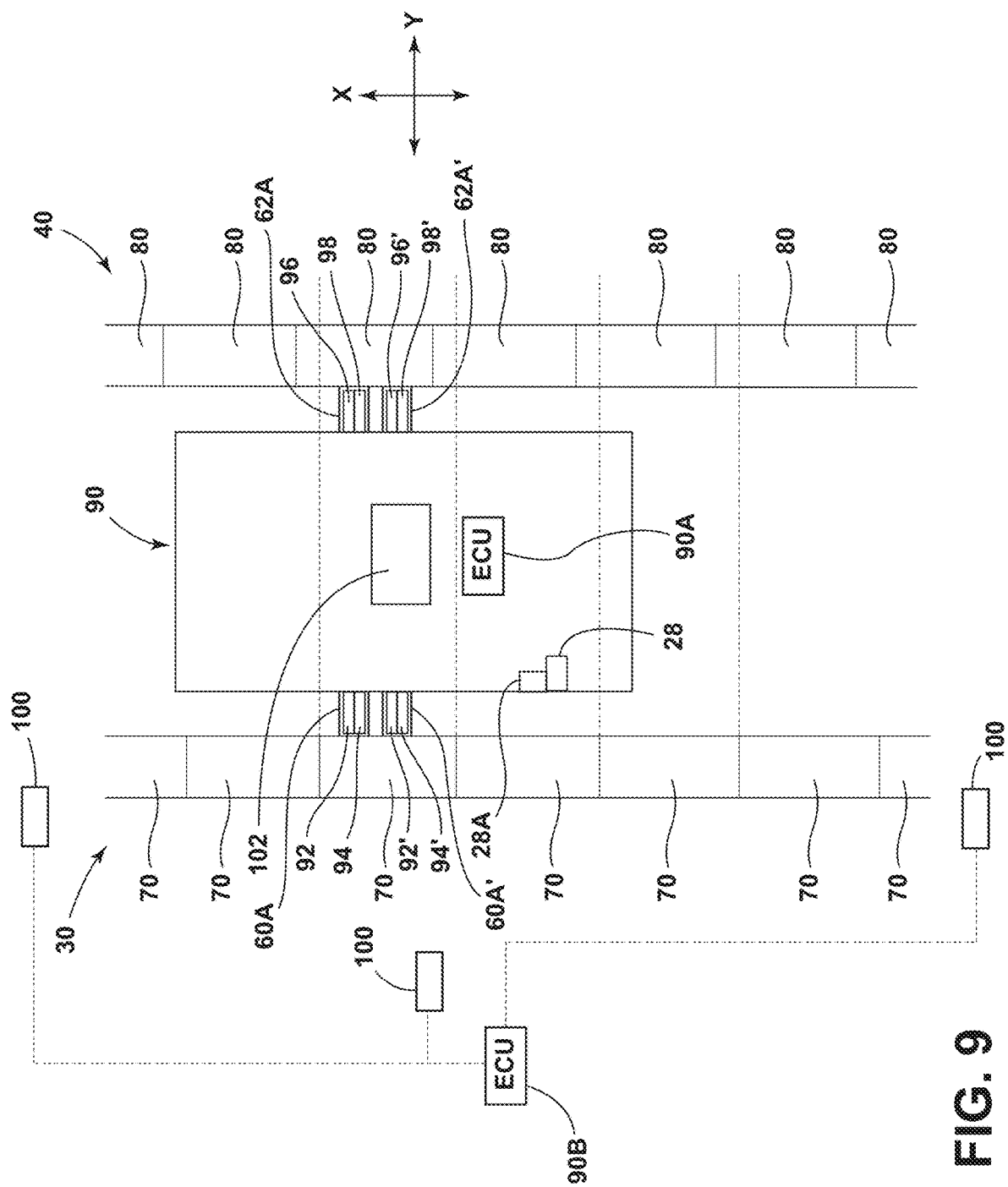
FIG. 9 is a top view generally illustrating portions of a track assembly according to teachings of the present disclosure.

With embodiments, a first sensor 92 and/or a second sensor 94 may be disposed at least partially in and/or may be connected to the protrusion 60A. A third sensor 96 and/or a fourth sensor 98 may be disposed at least partially in and/or may be connected to the protrusion 62A. For example and without limitation, the sensors 92, 94 may rotate with the first armature 60 and/or the sensors 96, 98 may rotate with the second armature 62. The armature 60, 62 may selectively rotate between a first position (e.g., an engaged position—see FIGS. 5A and 5B) in which the protrusions 60A, 60B are disposed proximate the first walls 34A, 44A (e.g., disposed substantially parallel to the Y-direction) and a second position (e.g., a disengaged position—see FIG. 5C) in which the protrusions 60A, 60B are disposed substantially in the middle of the tracks 30, 40 (e.g., disposed substantially parallel to the X-direction). When the armatures 60, 62 are rotated to the disengaged position, the protrusions 60A, 62A may be disposed substantially in and/or aligned with the gap 38 of the first track 30 and/or the second track 40, and the support assembly 50 may be removed from (or inserted into) the first track 30 and/or the second track 40 (e.g., in the Z-direction). When armatures 60, 62 are disposed in an engaged position, the protrusions 60A, 62A may be vertically aligned with (e.g., overlap in the Z-direction) with the first wall 34A, 44A of the inner track 34, 44 (see, e.g., FIGS. 5A and 5B), which may restrict removal of the support assembly 50 from the track 22. In embodiments, such as generally illustrated in FIGS. 5D and 9, an armature 60, 62 may include a first protrusion 60A, 62A and a second protrusion 60A', 62A' that may be disposed in a forked or dual configuration. The first protrusion 60A may include a first sensor 92 and/or a second sensor 94. The second protrusion 60A' may include a third sensor 92' and/or a fourth sensor 94'. The protrusion 62A may include sensors 96, 98 and/or the protrusion 62A' may include sensors 96', 98'. For example and without limitation, an armature 60, 62 may include a first set of one or more sensors and a second set of one or more sensors that may be offset from each other, such as in the X-direction when in the engaged position.

Figure 8:
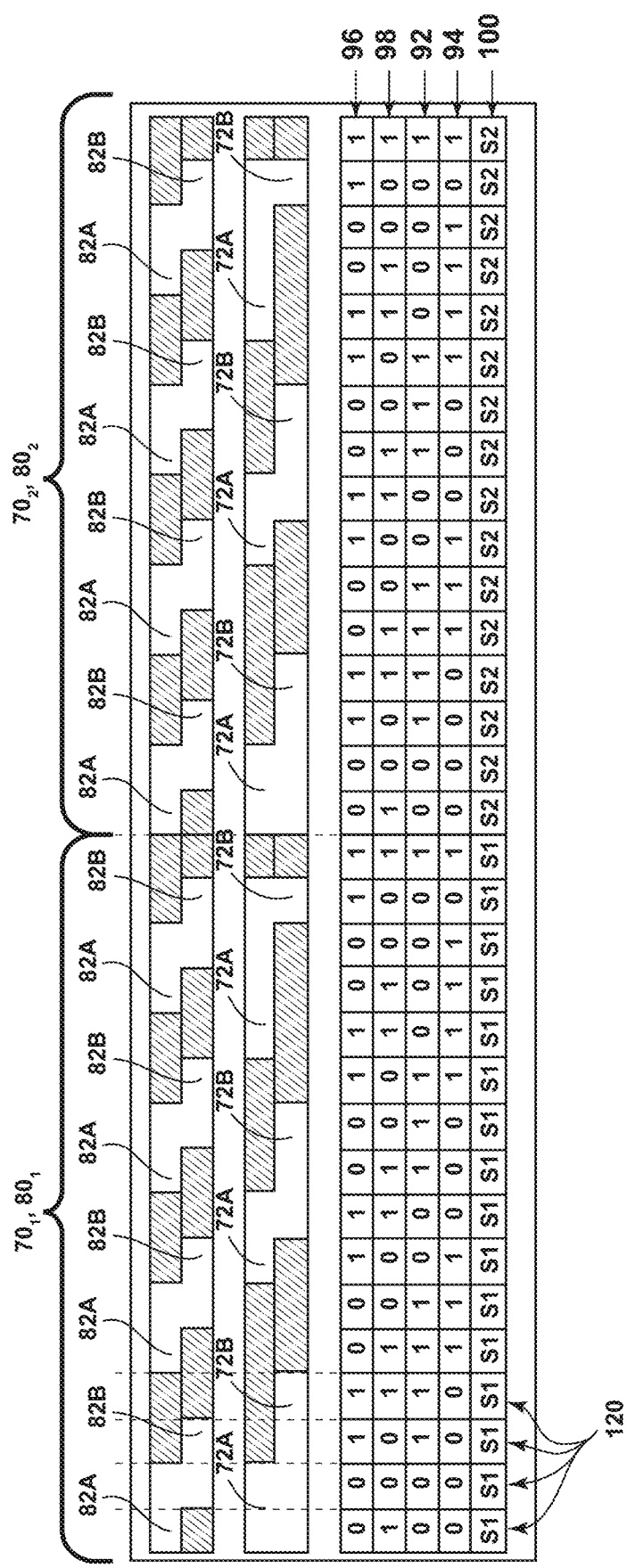
FIG. 8 is a representation generally illustrating portions of a first track and a second track read into binary information according to teachings of the present disclosure.

With embodiments, such as generally illustrated in FIGS. 6, 8, and 9, the track 22 may include a plurality of segments 70 (e.g., segments 70$_1$, 70$_2$). Each of the segments 70 may include a plurality of first features 72. The plurality of first features 72 may be aligned and/or may extend substantially in the X-direction. The first features 72 may, for example and without limitation, be connected to and/or incorporated with the outer track 32 (e.g., walls 32A, 32B, 32C) and/or the inner track 34 (e.g., walls 34A, 34B, 34C). The plurality of first features 72 may include one or more of a variety of shapes, sizes, and/or configurations. For example and without limitation, the first features 72 may be a combination of rectangular shapes, and/or may include recesses, apertures, projections, printed code, magnets, and/or coils (e.g., to generate/modify a magnetic field), among others. In embodiments, a sensor 92, 94, 96, 98 may, for example and without limitation, be configured to sense a change in a magnetic field caused by the magnet or coil, and/or sense a difference between a solid/flat portion of the track 22 and an aperture or projection. Magnets and/or coils may be part of a copper layer in a flat, flexible printed circuit board (PCB) attached to the inner track 34, 44, and/or may be overmolded in a plastic bar/strip attached to the inner track 34, 44. Some or all of the first features 72 of a segment 70 may include a different/unique shape. The plurality of first features 72 of a segment 70 may, for example and without limitation, include about three features or more or less features. The first features 72 in a segment 70 may each include different shapes and/or sizes. The segments 70 may include substantially identical configurations of first features 72 such that each segment 70 may repeat a series or a pattern of first features 72 (e.g., each segment 70 of a track 22 may be substantially the same with the same unique first features 72).

In embodiments, the first features 72 may, for example and without limitation) include a first portion 72A and/or a second portion 72B (or more or fewer portions). The first portion 72A may be disposed substantially adjacent to the second portion 72B (e.g., the first portion 72A may overlap, at least to some degree, in at least one direction, such as the Z-direction, with the second portion 72B). For example and without limitation, the first portion 72A may be disposed vertically (e.g., in the Z-direction) above the second portion 72B. The first portion 72A and the second portion 72B may include substantially the same height (e.g., about 6 mm, for a combined height of about 12 mm in some sections). The first portion 72A and the second portion 72B may or may not include the same lengths. Lengths of the first portion 72A and/or the second portion 72B may, for example and without limitation, be about 10 mm to about 80 mm.

With embodiments, such as generally illustrated in FIGS. 7, 8, and 9, a track 22 may include a plurality of segments 80 (e.g., segments 80$_1$, 80$_2$). The segments 80 may include a plurality of second features 82. The second features 82 may include similar or the same configurations as the first features 72. The segments 80 may or may not be aligned (e.g., in the Y-direction) with the segments 70. The plurality of second features 82 may be aligned and/or may extend substantially in the X-direction. The plurality of second features 82 may include one or more of a variety of shapes, sizes, and/or configurations. For example and without limitation the second features 82 may be a combination of rectangular shapes. Each of the second features 82 may include the same shape and/or be substantially similar shaped. The plurality of second features 82 in each segment 80 may include about four or more or less features 82. The second features 82 may, for example and without limitation, be connected to and/or incorporated with the outer track 42 (e.g., walls 42A, 42B, 42C) and/or the inner track 44 (e.g., walls 44A, 44B, 44C).

In embodiments, the second features 82 may, for example and without limitation, include a third portion 82A and/or a fourth portion 82B (or more or fewer portions). The third portion 82A may be disposed substantially adjacent to the fourth portion 82B (e.g., the third portion 82A may overlap, at least to some degree, in at least one direction with the fourth portion 82B). For example and without limitation, the third portion 82A may be disposed vertically (e.g., in the Z-direction) above the fourth portion 82B. The third portion 82A and the fourth portion 82B may include substantially the same height (e.g., about 6 mm, for a combined height of about 12 mm in some sections). The third portion 82A and the fourth portion 82B may include the same length. The third portion 82A and/or the fourth portion 82B may, for example and without limitation, include a length of about 10 mm to about 80 mm. Shapes of the features 72, 82 may be chosen to simplify manufacture of the features 72, 82.

In embodiments, the track assembly 20 may include a first electronic control unit (ECU) 90A that may be connected to and/or incorporated with the support assembly 50. Additionally or alternatively, the track assembly 20 may include a second ECU 90B that may be connected to the track 22. The track assembly 20 may include a first location system 86. The first location system 86 may include and/or be connected to the first ECU 90A and/or the second ECU 90B. The first ECU 90A may be disposed in the support assembly 50, the first support member 52, and/or the second support member 54. The first location system 86 may include one or more sensors, such as a first sensor 92, a second sensor 94, a third sensor 96, and/or a fourth sensor 98 (or more of fewer sensors) that may be connected to the support assembly 50 (see, e.g., FIGS. 6 and 7). The first ECU 90A may be connected to some or all of the sensors 92, 92', 94, 94', 96, 96', 98, 98'. The sensors 92, 92', 94, 94', 96, 96', 98, 98' may include one or more of a variety of sensors. For example, the sensors 92, 92', 94, 94', 96, 96', 98, 98' may be proximity sensors, magnetic sensors, optical sensors, and/or hall sensors. The sensors 92, 92', 94, 94', 96, 96', 98, 98 may be configured to detect a feature 72, 82 or a track 30, 40 (e.g., or a solid portion of the track 30, 40). The first sensor 92 and/or the second sensor 94 may be incorporated into a single sensing unit to simultaneously sense the features 72 (e.g., the first portion 72A and the second portion 72B). The first sensor 92 and/or the second sensor 94 may be configured to function as a single sensor. The third sensor 96 and/or the fourth sensor 98 may be incorporated into a single sensing unit to simultaneously sense the features 82 (e.g., the first portion 82A and the second portion 82B). The third sensor 96 and/or the fourth sensor 98 may be configured to function as a single sensor.

With embodiments, the first sensor 92 may be aligned with and/or configured to sense the first portions 72A of the first features 72. The second sensor 94 may be aligned with and/or configured to sense the second portions 72B of the first features 72. For example and without limitation, the first sensor 92 may be disposed at least partially above the second sensor 94 (e.g., in the Z-direction). The third sensor 96 may be aligned with and/or configured to sense the third portions 82A of the second features 82. The fourth sensor 98 may be aligned with and/or configured to sense the fourth portions 82B of the second features 82. For example and without limitation, the third sensor 96 may be disposed at least partially above the fourth sensor 98 (e.g., in the Z-direction).

In embodiments, the first ECU 90A may be configured to receive information from the sensors 92, 94, 96, 98 to determine the position of the support assembly 50 with respect to the tracks 30, 40. As generally illustrated in FIG. 8, the first ECU 90A may be configured to determine a value (e.g., a position within a segment 70, 80) from the information received from the first sensor 92, the second sensor 94, the third sensor 96, and/or the fourth sensor 98. If a feature 72, 82 is detected by a sensor 92, 94, 96, 98, the first ECU 90A may store a first value (e.g., "0"). If a solid portion of the track 22 (e.g., a portion without a feature 72, 82) is detected, the first ECU 90A may store a second value (e.g., "1"). For example and without limitation, the first ECU 90A may store binary values based on the information provided by or received from the sensors 92, 94, 96, 98. With embodiments, the values other than binary values may be used. For example and without limitation, the sensors 92, 92', 94, 94', 96, 96', 98, 98 may be configured to provide more than two values (e.g., three values), such as if the segments 70, 80 includes more than one type of feature (e.g., a first type of feature, such as an aperture, and a second type of feature, such as a grill or triangular shape) in addition to portions without features (e.g., solid portions of the tracks 30, 40).

In embodiments, the track assembly 20 may include a second location system 88 that may be connected to and/or implemented at least partially with the first ECU 90A and/or the second ECU 90B. The second location system 88 may include one or more of a variety of wireless positioning systems, such as a received signal strength indicator (RSSI) system, a time of flight (TOF) system, and/or an angle of arrival (AOA) system. Examples of RSSI systems are generally described in U.S. Pat. Nos. 7,042,342 and 7,388,466, which are hereby incorporated by reference in their entireties. The second location system 88 may be connected to and/or include one or more receivers 100 (e.g., antennas) and/or a transmitter 102. The receiver 100 may be configured as an interface for radio waves, and/or the receiver 100 may be used in connection with a transmitter 102 and/or a receiver 100. The transmitter 102 and/or receivers 100 may, for example and without limitation, be configured to operate at low frequencies. The second location system 88 may include a relatively large tolerance, and/or the first location system 86 may include a better resolution than the second location system 88. For example and without limitation, a resolution/tolerance of the first location system 86 may correspond to the width of a section 120 (e.g., in the X-direction) and may be about 14 mm, about 7 mm, about 2 mm (or more or less). The second location system 88 may include a tolerance/resolution of about 20 cm to about 30 cm (e.g., an order of magnitude different). The first location system 86 may have a limited range, such as about 20 cm to about 30 cm, and/or the second location system 88 may include a larger range, such as, for example and without limitation, at least about 2 meters (e.g., via a plurality of receivers 100).

With embodiments, one or more receivers 100 may be disposed along the plurality of segments 70, 80 in the first track 30 and/or the second track 40. The first track 30 and/or the second track 40 may include one or more of a variety of receiver configurations. For example and without limitation, a receiver 100 may be disposed at or about the middle of a track 22, (see, e.g., FIG. 6) and/or a receiver 100 may be disposed at or about one or both ends of a track 22 (see, e.g., FIGS. 7 and 9). The first track 30 and/or the second track 40 may include any number of receivers 100 for determining the second location of the support assembly 50. For example and without limitation, one receiver 100 may be provided when one segment 70, 80 is disposed in the track 22, and/or two receivers 100 may be provided when two and/or three segments 70, 80 are disposed in the track 22. With embodiments, the number of receivers 100 may be selected to accurately identify the location of the transmitter 102 (e.g., in which segment 70, 80 the support assembly 50 is disposed).

With embodiments, the first ECU 90A and/or the second ECU 90B may be configured for and/or include circuitry for measuring and/or storing the second location information from the one or more receivers 100. The first ECU 90A and/or the second ECU 90B may be configured to determine which receiver 100 is closest to the transmitter 102 based on which receiver 100 generates the strongest received signal in the transmitter 102. The transmitter 102 may be connected to and/or incorporated with the support assembly 50. The first ECU 90A and/or the second ECU 90B may be configured to determine a second location of the support assembly 50 via the second location system 88.

In embodiments, the first ECU 90A and/or the second ECU 90B may be configured to determine the location of the transmitter 102 with respect to the one or more receivers 100. The first ECU 90A and/or the second ECU 90B may receive information (e.g., a signal strength value) from each of the receivers 100, and/or the ECU 90A, 90B may use the signal strength from each receiver 100 to determine in which segment 70, 80 that the transmitter 102 is disposed (e.g., which segment 70, 80 the transmitter 102 is aligned with in the Y-direction). The first ECU 90A may be configured to receive information direction from a receiver 100 and/or may receive information from a receiver 100 indirectly, such as via the second ECU 90B).

With embodiments, the first ECU 90A may be configured to determine a first location and a second location of the support assembly 50 along the track 22. The first location may correspond to the position of the support assembly 50 within a segment 70, 80. The second location may correspond to which segment 70, 80 of the plurality of segments 70, 80 that the support assembly 50 is disposed in. The first ECU 90A may receive information from the first sensor 92 and/or the second sensor 94 detecting one feature 72 of the plurality of first features 72. The first ECU 90A may receive information from the first sensor 92 sensing the first portion 72A of the first feature 72, and/or the first ECU 90A may receive information from the second sensor 94 sensing the second portion 72B of the first feature 72. The first ECU 90A may compare the values from the first sensor 92 and/or the second sensor 94 with a profile stored in and/or connected to the first ECU 90A. The profile may include the configurations of the first features 72 and the second features 82, and the expected values from the first sensor 92 and/or the second sensor 94 paired with a location along the segment 70, 80. The first ECU 90A may be configured to receive information from the first sensor 92 and/or the second sensor 94, compare the values with the profile, and/or determine a location of the transmitter 102 (e.g., support assembly 50) along the respective segment 70, 80 (see, e.g., FIG. 8).

In embodiments, the second location may correspond to and/or include which segment 70, 80 along the track 22 that the support assembly 50 is disposed in (e.g., with which segment 70, 80 the support assembly 50 and/or sensors 92, 94, 96, 98 may be aligned in the Y-direction). The second location may, for example and without limitation, include a tolerance that may correspond to the length of the segments 70, 80 (e.g., the tolerance may be about 300 mm if the length of each segment 70, 80 is about 300 mm). The segments 70, 80 may include a length of about 300 mm, or may be longer or shorter. The length of the segment 70, 80 may depend on the signal strength of the transmitter 102 and/or the receivers 100 (e.g., smaller segments 70, 80 may be used for weaker signals between the transmitter 102 and receivers 100, and/or larger segments 70, 80 may be used for stronger signals between the transmitter 102 and receivers 100). The data (e.g. RSSI, TOF, and/or AOA data) received by the first ECU 90A may be used in identifying which segment 70, 80 the support assembly 50 is located in. The first ECU 90A may use the first location and/or the second location to determine an absolute location/position of the support assembly 50 along the track 22. For example and without limitation, the first ECU 90A may use the second location determine in which segment 70, 80 the support assembly 50 is disposed and may use the first location to determine where in that segment 70, 80 the support assembly 50 is disposed.

With embodiments, the first ECU 90A may be configured to determine a first location and/or a second location of the support assembly 50 along the track 22. The first ECU 90A may receive information from the first sensor 92, the second sensor 94, the third sensor 96, and/or the fourth sensor 98 in determining the first location of the support assembly 50. The first ECU 90A may receive information from the first sensor 92 and/or the second sensor 94 in relation to the first track 30, and/or the first ECU 90A may receive information from the third sensor 96 and/or the fourth sensor 98 in relation to the second track 40. The first ECU 90A may use information from both the first track 30 and the second track 40 in determining the second position of the support assembly 50.

In embodiments, such as generally illustrated in FIG. 8, the segments 70 of the first track 30 may be aligned with the segments 80 of the second track 40 (e.g., may be disposed at equivalent longitudinal positions along the tracks 30, 40). With embodiments, such as generally illustrated in FIG. 9, the segments 70 of the first track 30 may be offset from the segments 80 of the second track 40. The segments 70, 80 may be offset to increase resolution of the first location. For example and without limitation, edges of the first portion 72A and/or the second portion 72B of the first features 72 may not be aligned with edges of the third portion 82A and/or the fourth portion 82B of the second features 82. The leading edges of the second features 82 may be offset in the X-direction from the leading edges of the first features 72. The resolution of the first location may be improved (e.g., doubled to about 7 mm, from about 14-16 mm) by offsetting the segments 70, 80.

In embodiments, the configurations of the first features 72 (e.g., in each segment 70) may be different from the configurations of the second features 82 (e.g., in each segment 80). The first ECU 90A may include (e.g., have stored therein) and/or be configured to receive a first profile that includes the configurations of the first features 72 and/or a second profile that includes the configurations of the second features 82. The first features 72 and the second features 82 may be provided with different tracks (e.g., the first track 30 and the second track 40), and/or the first features 72 and the second features 82 may be provided with the same track (e.g., the first track 30 or the second track 40).

With embodiments, if the support assembly 50 is connected with the track 22 in a first direction (e.g., forward facing), the first sensor 92 and the second sensor 94 may be disposed to sense the first portions 72A and second portions 72B of the first features 72, and the third sensor 96 and the fourth sensor 98 may be disposed to sense the third portions 82A and fourth portions 82B of the second features 82. If the support assembly 50 is connected with the track 22 in a second direction (e.g., rearward facing), the first sensor 92 and the second sensor 94 may be disposed to sense the third portions 82A and the fourth portions 82B of the second features 82, and the third sensor 96 and the fourth sensor 98 may be disposed to sense the first portions 72A and the second portions 72B of the first features 72. The first ECU 90A may be configured to determine in which direction the support assembly 50 is connected according to which feature portions 72A, 72B, 82A, 82B the sensors 92, 94, 96, 98 sense. For example and without limitation, if the first ECU 90A determines that the first sensor 92 and the second sensor 94 are sensing the third portions 82A and the fourth portions 82B of the second features 82, the first ECU 90A may determine that the support assembly 50 is connected in the second direction. Additionally or alternatively, the first ECU 90A may determine a direction of the support assembly 50 according to the polarity of the power provided to the first ECU 90A and may adjust a stored profile/table to which information from the sensors 92, 92', 94, 94', 96, 96', 98, 98 may be compared.

Referring again to FIGS. 5D, 9, and 9A, in embodiments, a track assembly 20 may include a plurality of sensors (e.g., 92, 92', 94, 94' and/or 96, 98, 96', 98') that may be offset in the X-direction (e.g., the direction of travel) and/or that may be connected to the same armature 60, 62 (e.g., with protrusions 60A, 60A, 62A, 62A'). With such a configuration, four sensor readings (e.g., two bits plus two bits) may be obtained substantially simultaneously from a single plurality of features (e.g., features 72 or 82) that may be configured with multiple portions 72A, 72B or 82A, 82B disposed in two substantially horizontal lines. For example and without limitation, offset sensors may be configured to obtain (e.g., simultaneously) two pairs of bits from consecutive sections 120 of the same features 72 or 82. The two pairs of bits may provide two two-bit numbers. The features 72, 82 may be configured such that each pairing of consecutive two-bit numbers is unique (e.g., is not repeated within a segment 70, 80). With such a configuration, the first ECU 90A may be configured to determine where in a segment 70, 80 a support assembly 50 is located.

Figure 9A:
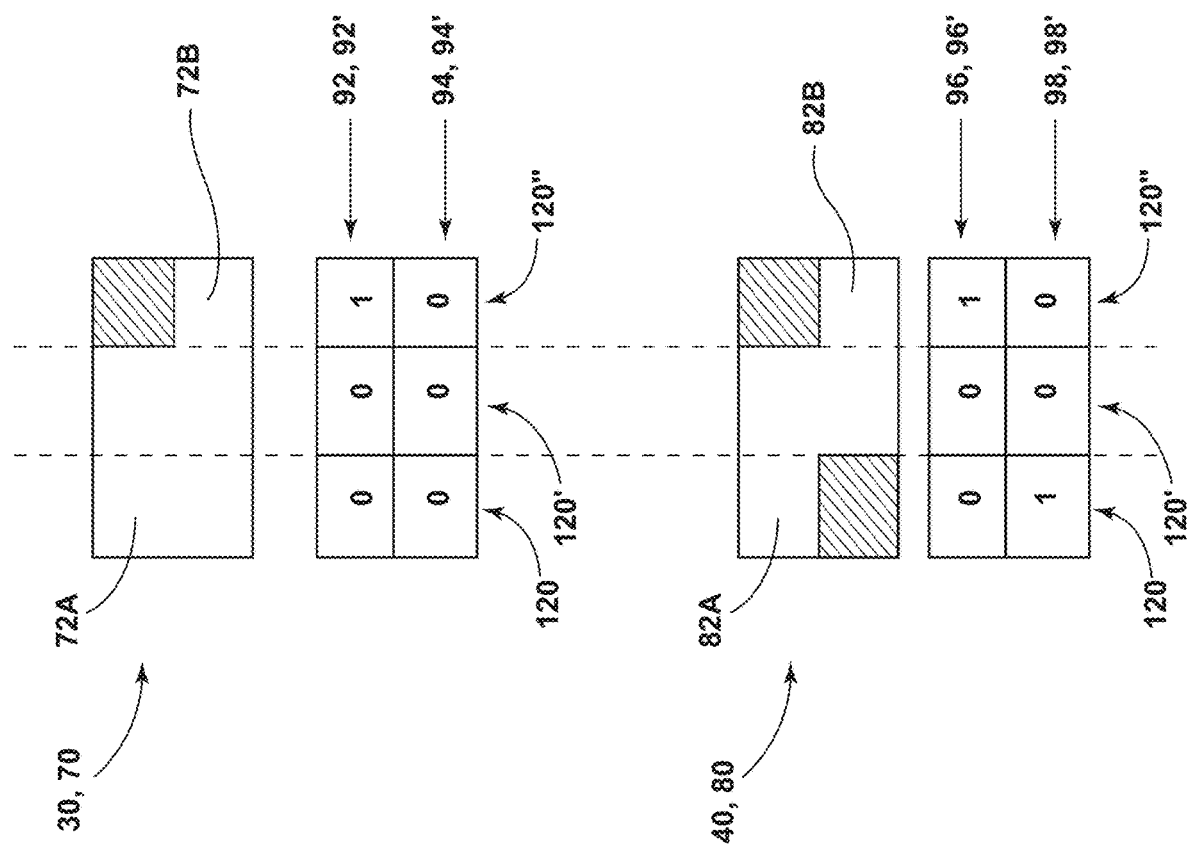
FIG. 9A is a representation of embodiments of portions of tracks and corresponding readings from sensors according to teachings of the present disclosure.

With embodiments, such as generally illustrated in FIGS. 9 and 9A, if a track assembly 20 includes offset sensors 92, 92', 94, 94' associated with the first features 72 (e.g., of a first track 30) and offset sensors 96, 98, 96', 98' associated with the second features 82 (e.g., of the second track 40), which may involve eight sensors, the offset sensors may be configured to obtain, substantially simultaneously, a first pair of two bits from the first features 72 (e.g., one bit each from offset sensors 92, 92', 94, 94') and a second pair of two bits from the second feature 82 (e.g., one bit each from offset sensors 96, 98, 96', 98'). The offset sensors may be configured to sense consecutive sections (e.g., sections 120 and 120' or sections 120' and 120") so each pair of two bits may correspond to consecutive sections of portions 72A, 72B, 82A, 82B of the features 72, 82. Each set of offset sensors (e.g., sensors 92, 94, 96, 98 and sensors 92', 94', 96', 98'), may provide sixteen different numbers combinations (e.g., 0 to 15).

With embodiments, the plurality of features 72, 82 may be configured such that a first set of sensors 92, 94, 96, 98 and a second set of sensors 92', 94', 96', 98' may sense/provide a unique combined reading at each location along a segment 70, 80. With four sets of sensors, eights readings (e.g., two four-digit numbers having sixteen number combinations each) may be obtained at some or all positions of the support assembly 50 along the track 22. For example and without limitation, with just five number combinations (for illustration, although the track assembly 20 may be configured to provide sixteen, or more or fewer, number combinations), the features 72, 82 may be configured such that the sensors read 1 1 2 2 3 3 4 4 5 5 4 3 2 1 3 5 3 1 4 2 4 1 5 2 5 1 (e.g., 26 different aperture configurations/sections 120, without two adjacent number pairs being repeated, within a single segment 70, 80). The first ECU 90A may include the aperture configurations and be configured to determine a location of the support assembly 50, such as after reading two consecutive sections 120, 120' at the same time via two sets of sensors (e.g., a first section 120 via sensors 92, 94, 96, 98 and a second section 120' via sensors 92', 94', 96', 98'). For example and without limitation, as generally illustrated in FIG. 9A, if a first reading (from sensors 92, 94, 96, 98 sensing section 120) is "0001", which may correspond to the value 8, and the second reading (from sensors 92', 94', 96', 98' sensing section 120') is "0000", which may correspond to the value 0, the first ECU 90A may determine that the support assembly 50 is aligned with the first section 120 of the segments 70, 80 (e.g., since the only consecutive pairing of 8 and 0 is between the first section 120 and the second sections 120'. Similarly, if the first reading is "0000" (from sensors 92, 94, 96, 98 sensing section 120') and the second reading is "1010" (from sensors 92', 94', 96', 98' sensing section 120"), which may correspond to the value 5, the first ECU 90A may determine that the support assembly 50 is aligned with the second section 120' of the segments 70, 80 since the only consecutive pair of 0 and 5 is between the second section 120' and the third section 120".

With sixteen different number combinations, 257 different aperture configurations could be utilized. Such configurations with offset sensors 92, 92', 94, 94', 96, 96', 98, 98' may allow for longer segments 70, 80 (or a single segment) and/or may effectively replace the second location system 88. For example and without limitation, the first track 30 and the second track 40 may include a single segment 70, 80, respectively, that may be aligned with each other and may extend along an entire length of the tracks 30, 40, which may be about 1 meter to about 2 meters long.

With embodiments, a method of operating a track assembly 20 may include engaging (e.g., inserting in the Z-direction) a support assembly 50 with a first track 30 and/or a second track 40. The first ECU 90A may operate the first sensor 92, the second sensor 94, the third sensor 96, and/or the fourth sensor 98 to sense the first features 72 and/or the second features 82. The sensors 92, 94, 96, 98 may send information (e.g., data, values, a first binary number, and/or a second binary number, etc.) to the first ECU 90A such that the first ECU 90A may determine the location, in the X-direction, of the support assembly 50 within a segment 70, 80 (e.g., a first location). The second ECU 90B may operate the transmitter 102 and/or the one or more receivers 100 to obtain information (e.g., signal strength information) from each of the receivers 100. The second ECU 90B may provide the information (e.g., second location information) to the first ECU 90A. One or both of the ECUs 90A, 90B may analyze the second location information to determine which segment 70, 80 the transmitter 102 (e.g., the support assembly 50) is aligned with in the Y-direction (e.g., a second location). The first ECU 90A may use the first location and/or the second location to determine (e.g., calculate) the absolute position of the support assembly 50 along the track 22. The support assembly 50 may move (e.g., in the X-direction) along the track 22, such as manually and/or via a motor 28 (see, e.g., FIG. 9). The first ECU 90A may continuously and/or periodically receive information from the sensors 92, 94, 96, 98, the transmitter 102, and/or the receivers 100 to determine the absolute position of the support assembly 50 during movement along the track 22 in the X-direction. In some circumstances, information from the receivers 100 and/or transmitter 102 may be used with the sensors 92, 94, 96, 98 in an initial determination of a location, and the sensors 92, 94, 96, 98 may be used for determining additional locations (e.g., without the receivers 100/transmitter 102). Additionally or alternatively, the receivers 100/transmitter 102 may be used to confirm a determined location, such as to test the proper functioning of the sensors 92, 94, 96, 98.

In embodiments, the track assembly 20 may include one or more additional support assemblies 50. An ECU 90A, 90B may be configured to determine the absolute position of each of the support assemblies 50 along the tracks 30, 40. An ECU 90A, 90B may use the absolute positions of the support assemblies 50 to move the support assemblies 50 without conflict/collision.

With some designs, relative locations may be determined (as opposed to an absolute location). With such designs, the location determination may rely upon a known initial position (e.g., full front, full rear, etc.) and determine how far a component has moved from that initial position or reference point. With removable or reconfigurable systems/seats, it may not be feasible to always connect a component/seat at a known location or reference point. For example and without limitation, a vehicle user may desire to connect a seat in a desired seating position that may not be at a known location. Determining an absolute position of a support assembly 50 may be conducted regardless of where a support assembly 50/seat 24 is connected.

While embodiments are described and illustrated with a first track 30 and/or a second track 40 having features 72, 82 including two portions 72A, 72B, 82A, 82B (e.g., vertically stacked portions), other embodiments may include additional feature portions, such as three or more vertically stacked portions that may each form a substantially horizontal line extending in the X-direction with a pattern/arrangement of features 72, 82 (or the lack thereof). The support assembly 50 may include a sensor 92, 94, 96, 98 for each portion/line.

While embodiments are described and illustrated with features 72, 82 having portions 72A, 72B, 82A, 82B connected to each other (e.g., the first portions 72A and second portions 72B of the first features 72), such as to form a continuous feature, features 72, 82 may include independent/discrete portions 72A, 72B, 82A, 82B that may be offset from each other, such as in a vertical/Z-direction.

While embodiments are described and illustrated with a transmitter 102 connected to the support assembly 50 and receivers 100 associated with the track 22, an opposite configuration could be utilized in which a plurality of transmitters 102 are associated with the track 22 and a receiver 100 is connected to the support assembly 50. Additionally or alternatively, a transmitter 102 and/or a receiver 100 may be configured as a transceiver and may be configured to transmit and receive light.

While some embodiments are described and illustrated with a motor 28, other embodiments may not include a motor 28 (or a drive sensor 28a) and/or may be configured for manual operation. In embodiments that include a motor 28, the motor 28 may include and/or be connected to a sensor 28a that may sense the number of rotations of the motor 28 (see, e.g., FIG. 9). An ECU 90A, 90B may be configured to use such rotation information in addition to information from the sensor 92, 94, 96, 98 and/or the receivers 100/transmitter 102.

In embodiments, an ECU 90A, 90B may include an electronic controller and/or include an electronic processor, such as a programmable microprocessor and/or microcontroller. In embodiments, an ECU 90A, 90B may include, for example, an application specific integrated circuit (ASIC). An ECU 90A, 90B may include a central processing unit (CPU), a memory (e.g., a non-transitory computer-readable storage medium), and/or an input/output (I/O) interface. An ECU 90A, 90B may be configured to perform various functions, including those described in greater detail herein, with appropriate programming instructions and/or code embodied in software, hardware, and/or other medium. In embodiments, an ECU 90A, 90B may include a plurality of controllers. In embodiments, an ECU 90A, 90B may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU) 90, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A track assembly, including:
   a support assembly;
   an electronic control unit; and
   a track including a first track having one or more segments, the first track configured to be fixed to a mounting surface;
   wherein the one or more segments include a plurality of first features;
   the support assembly is configured to move along the track and is configured to be removed from the track in a direction substantially perpendicular to the track;
   the support assembly includes one or more sensors connected to the electronic control unit; and
   the electronic control unit is configured to determine a first location of the support assembly along the one or more segments via the plurality of first features and the one or more sensors.

2. The track assembly of claim 1, wherein the one or more sensors are disposed substantially in the track.

3. The track assembly of claim 1, wherein the one or more sensors are configured to sense the plurality of first features.

4. The track assembly of claim 3, wherein the first features include a first portion and a second portion;
   the first portion is adjacent the second portion;
   a first sensor of the one or more sensors is configured to sense the first portion; and
   a second sensor of the one or more sensors is configured to sense the second portion.

5. The track assembly of claim 3, wherein the electronic control unit is configured to obtain information from the one or more sensors; and the electronic control unit includes a profile of location information.

6. The track assembly of claim 5, wherein the electronic control unit is configured to compare the information from the one or more sensors with the profile to determine an absolute location of the support assembly.

7. The track assembly of claim 1, wherein each segment of the one or more segments includes substantially the same configuration of the plurality of first features; and each first feature of the configuration has a unique shape.

8. The track assembly of claim 1, wherein the track includes a second track having a plurality of second features; the one or more sensors includes a first sensor, a second sensor, a third sensor, and a fourth sensor; the first sensor and the second sensor are configured to sense the plurality of first features; and the third sensor and the fourth sensor are configured to sense the plurality of second features.

9. The track assembly of claim 8, wherein the electronic control unit is configured to receive information from the third sensor and the fourth sensor to determine an absolute location of the support assembly along the track.

10. The track assembly of claim 9, wherein the electronic control unit is configured to determine the absolute location of the support assembly via information from the first sensor and the second sensor, and information from the third sensor and the fourth sensor.

11. The track assembly of claim 9, wherein the second track includes one or more second segments; the one or more second segments of the second track include the plurality of second features; and at least one of the plurality of second features has a different shape than at least one of the first features.

12. The track assembly of claim 1, wherein the one or more sensors includes a first sensor, a second sensor, a third sensor, and a fourth sensor configured to sense the plurality of first features; and the first sensor and the second sensor are offset in an X-direction from the third sensor and the fourth sensor.

13. A track assembly, comprising:
    a support assembly;
    an electronic control unit;
    a track including a first track having a plurality of segments;
    a first location system including one or more sensors;
    a second location system including:
      a transmitter; and
      a receiver;
    wherein the plurality of segments include a plurality of first features;
    the electronic control unit is connected to the first location system and the second location system;
    the electronic control unit is configured to determine, via the first location system, a first location of the support assembly;
    the electronic control unit is configured to determine, via the second location system, a second location of the support assembly;
    the second location includes a segment of the plurality of segments in which the support assembly is at least partially disposed; and
    the first location is a location of the support assembly within the segment.

14. The track assembly of claim 13, wherein the electronic control unit is configured to determine an absolute position of the support assembly along the track via the first location and the second location;
    the electronic control unit is configured to receive sensor information from the one or more sensors to determine the first location; and
    the electronic control unit is configured to receive signal information from the receiver to determine the second location.

15. The track assembly of claim 14, wherein the track is at least 100 cm long; and a combined resolution of the first location system and the second location system is about 2 mm or less.

16. The track assembly of claim 14, including one or more additional receivers; wherein the transmitter is connected to move with the support assembly; the receiver and the one or more additional receivers are disposed proximate the plurality of segments; and the electronic control unit is configured to receive, directly and/or indirectly, information from the receiver and the one or more additional receivers indicating a transmitter location.

17. The track assembly of claim 14, wherein the second location system includes a received signal strength system.

18. The track assembly of claim 12, wherein the support assembly includes an armature connected to move with and relative to the support assembly; and the first sensor, the second sensor, the third sensor, and the fourth sensor are connected to move with the armature.

19. The track assembly of claim 1, wherein the one or more sensors are configured to sense a leading edge of at least one of the plurality of first features.

20. The track assembly of claim 1, wherein the plurality of first features include apertures in the first track.

* * * * *